Nov. 1, 1955 P. COMISAROW 2,722,390
INITIAL DRAG INDUCER FOR PARACHUTES
Filed Nov. 2, 1953 2 Sheets-Sheet 1
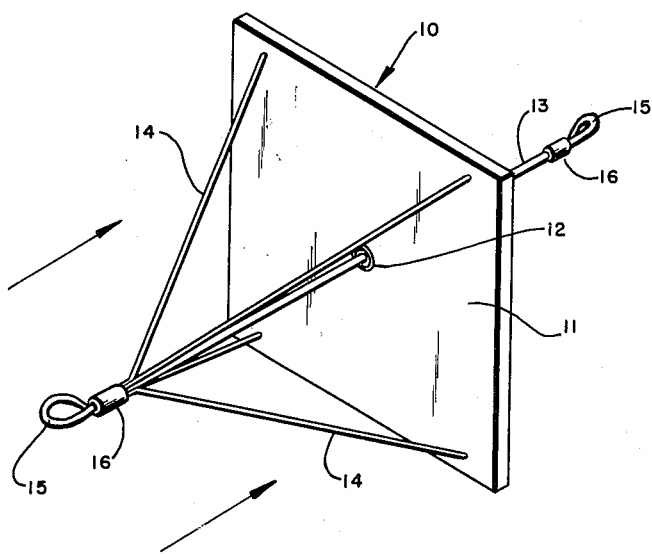
Fig. 1
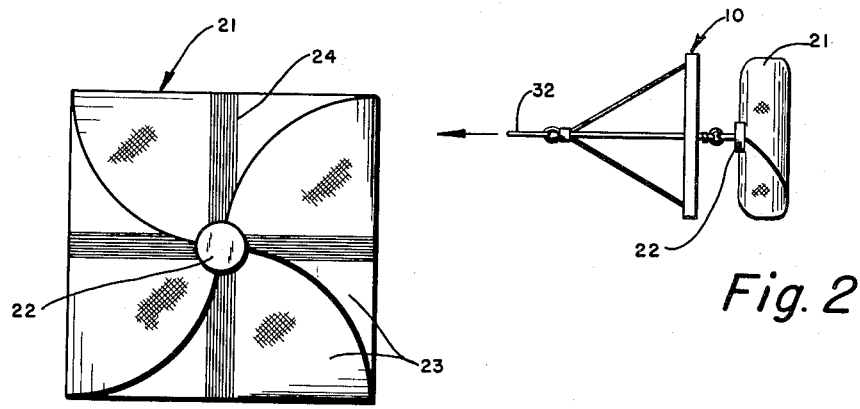
Fig. 3
Fig. 2
INVENTOR.
PAUL COMISAROW
BY
ATTORNEYS Nov. 1, 1955
P. COMISAROW
2,722,390
INITIAL DRAG INDUCER FOR PARACHUTES
Filed Nov. 2, 1953
2 Sheets-Sheet 2
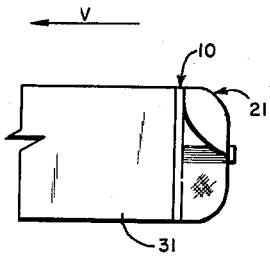
Fig. 4
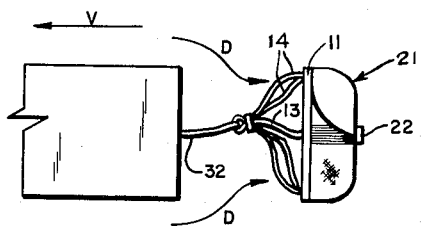
Fig. 5
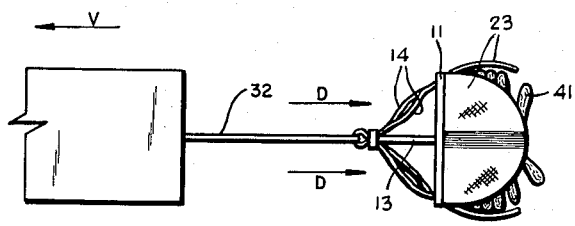
Fig. 6
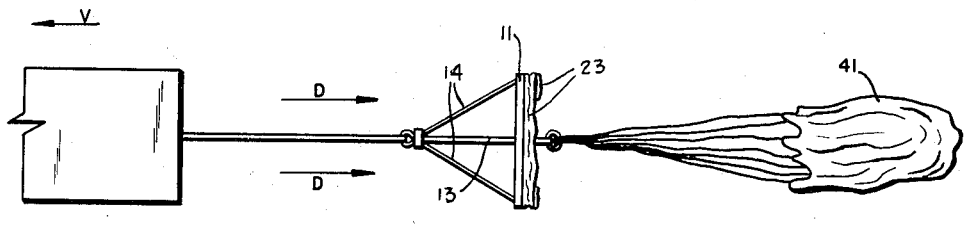
Fig. 7
INVENTOR.
PAUL COMISAROW
BY 
ATTORNEYS

United States Patent Office 2,722,390
Patented Nov. 1, 1955

2,722,390

INITIAL DRAG INDUCER FOR PARACHUTES

Paul Comisarow, Philadelphia, Pa., assignor to the United States of America as represented by the Secretary of the Navy Application November 2, 1953, Serial No. 389,897

4 Claims. (Cl. 244—149)

(Granted under Title 35, U. S. Code (1952), sec. 266)

The invention described herein may be manufactured and used by or for the Government of the United States of America for governmental purposes without the payment of any royalties thereon or therefor.

The instant invention relates to an initial drag inducer for parachutes and more particularly to a compact auxiliary means for use between a parachute and an object to be supported thereby, effective to substantially reduce the velocity of the object before the parachute is opened.

The problems confronted in attempting to lower objects by parachute from aircraft in flight have been intensified by the steadily increasing speeds at which aircraft operate. For example, when a conventional parachute canopy is opened at high speeds, the sudden application of a large drag load to the canopy will tear it and render it completely ineffective. One known method of combating this particular problem involves the use of special drag resistant parachutes such as the ribbon type in which the canopy is composed of a plurality of strips or ribbons of material arranged to spread apart under extreme loads without tearing, yet capable of cooperating under a reduced load to provide support for an object suspended therefrom. Such an arrangement is not entirely satisfactory for all applications.

The instant invention contemplates an alternate method of resolving the same problem by providing a means for creating and absorbing a substantial drag load in the interval after an object is dropped from an aircraft and before the parachute provided to support the object has opened. This initial drag inducer is designed to substantially reduce the velocity of the object to a rate of travel at which the parachute canopy can open without being torn apart.

An object of the instant invention is the provision of a means for initially reducing the velocity of an object to be supported by a parachute before the parachute is opened.

Another object is the provision of an initial drag inducer for parachutes automatically operable to slow an object to which a parachute is attached before the parachute is opened.

A further object is to provide an initial drag inducer arranged to be interposed in the means for connecting a parachute to an object to be lowered thereby.

Yet another object of this invention is the provision of an initial drag inducer effective as it is initially subjected to a high drag load to release a parachute from a parachute pack.

A final object is to provide an initial drag inducer especially suitable for dropping objects at very high speeds from aircraft which may be incorporated in or be attached directly to the pack for a parachute provided to support the object dropped.

Other objects and advantages will become apparent upon consideration of the following detailed description and the accompanying drawings wherein:

Fig. 1 shows a perspective view of a preferred embodiment of the initial drag inducer, Fig. 2 is a side elevation showing one arrangement for coupling the initial drag inducer to a parachute pack, Fig. 3 is a plan view of a typical parachute pack suitable for use with the instant invention, and Figs. 4, 5, 6 and 7 are side elevations, partially broken away, of an alternate arrangement for coupling the initial drag inducer to a parachute pack and to an object to be supported thereby, wherein successive views show the relationship between the various parts at successive stages of operation.

Referring now to the drawings, wherein like reference numerals refer to like or corresponding parts in each of the several views, the showing in Fig. 1 of the initial drag inducer 10 includes a substantially square drag plate 11 made of rigid sheet material and provided with central opening 12, an elongated link member 13 extending through the opening 12, and a plurality of tension stays 14 arranged to maintain the plate 11 in a position perpendicular to the link member 13 when a drag load is imposed upon the plate in the direction indicated by the arrows. The connecting loops 15 at the opposite ends of the link member 13 are secured by clamping collars 16.

Fig. 2 shows the initial drag inducer 10 in operable relation to a parachute pack 21 connected by the drag inducer 10 and cable 32 to an object not shown traveling in the direction indicated by the arrow. In this arrangement the parachute is released from the pack 21 by operation of a suitable time delay releasable closure mechanism 22.

Fig. 3 shows details of a parachute pack 21 suitable for use with the instant invention. With this pack the parachute is enclosed by flaps 23 retained in the positions shown by a suitable releasable closure means 22 and each provided with a suitable retracting means such as an elastic band 24.

Figs. 4 through 7 shows successive stages of operation of an alternate arrangement in which the parachute pack 21 is either mounted fixedly upon or alternatively incorporates the rigid drag plate 11 and in which the parachute pack releasable closure means 22 is actuated by the link member 13. With such an arrangement, positive actuation of the releasable closure mechanism 22 is assured by the application of a substantial drag load to the drag plate 11 which is transmitted through the link member 13 to the closure mechanism 22 as the cable 32 is drawn taut and before the tension stays 14 are drawn taut under the influence of the drag load applied to the plate 11. See particularly Figs. 5 and 6. Moreover, this arrangement provides for compact and convenient stowage of the parachute before the object 31 is dropped and for stowage of the pack 21 after the parachute has been released therefrom.

No specific means is illustrated or described for attaching the drag inducer 10 to the rear end of the container 31, because the drag inducer 10 may be maintained in the position shown in Fig. 4 prior to release of the container 31 by any of several suitable means therefor. For example, the container supporting means on or within an aircraft to which the container 31 is releasably secured may include clamping means to support drag inducer 10 adjacent the rear end of container 31. Alternatively, the drag inducer 10 may be secured to the container 31 by releasable attachment means arranged to be disconnected automatically as the container 31 is released from an aircraft. This automatic detachment of the drag inducer 10 from the container 31 may be achieved by any suitable releasing means such as a lanyard connected at one end to the attachment means and at the other end to the aircraft. Finally, such an attachment means for the drag inducer 10 may conveniently include spring biasing means operative upon release of the attachment means to effect initial displacement of the drag inducer 10 from the container 31, to insure uniform operation of the drag inducer by eliminating uncertainty as to its initial rate of displacement from the container.

The operation of the instant invention can most readily be described in relation to the showing in Figs. 4 through 7. Fig. 4 shows the relative relationship between a parachute pack 21, the initial drag inducer 10, and an elongated container 31 to be lowered by parachute, as they are arranged for stowage within an aircraft prior to release therefrom. Fig. 5 shows the relationship immediately after release, with the drag inducer and the attached parachute pack falling away from the container although still connected thereto by means of a length of cable 32 either coiled or wound on a suitable reel within a recess in the end of the container 31. The substantial drag load which develops due to air pressure against the exposed surface of the drag inducer causes the cable 32 to be stretched to its full length so that it exerts a pull upon the adjoining end of the link member 13. In this arrangement the link member 13 actuates the releasable closure mechanism 22 as it is pulled taut to produce the relationship shown in Fig. 6. Thereafter, the continuing drag load upon the plate 11 produces a braking effect applied through the tension stays 14 and the cable 32 to slow the container 31 by a substantial amount before the canopy 41 is extended sufficiently to begin to fill with air. This relationship is illustrated in Fig. 7. Finally the canopy 41 of the parachute is filled and acts to lower the container slowly to the ground.

In operations involving parachute drops made at high velocities, the instant invention is effective to substantially reduce the release velocity in the interval before the main parachute is opened, so that the shock loading upon the parachute and the container attached thereto is decreased to a safe level.

When the velocities at which parachute drops are made increase to a point at which use of a small leader parachute is rendered ineffective or of reduced effectiveness the leader chute may be replaced with the initial drag inducer of the instant invention.

The instant invention is also useful in parachute drop operations in which it is desirable to unreel a substantial length of line from a container. Since the opening of the main parachute must be delayed until it is entirely clear of an aircraft, there is an attendant delay in unreeling the line. However, with the drag inducer of the instant invention incorporated, the drag inducer when subjected to a drag load becomes immediately effective for extracting the line from the container before the canopy of the parachute opens.

The plate which forms the initial drag inducer may be square as illustrated or rectangular, or circular, or any other suitable plan form. In addition, it may be hemispherical or conical or some other non-planar shape. Moreover, it may be foraminated to obtain improved stability characteristics, but with some reduction of the total drag it will produce. The plate may be fabricated from aluminum or other metal or from suitable plastic or other rigid sheet material.

Obviously other modifications and variations of the present invention are possible in the light of the above teachings. It is therefore to be understood that within the scope of the appended claims the invention may be practiced other than as specifically described.

What is claimed is:

1. A parachute initially enclosed in a releasable covering means, a quick releasable closure mechanism for said releasable covering, an object to be supported by said parachute, and an initial drag inducer interposed between and interconnecting said parachute and said object, said initial drag inducer comprising a drag member composed of sheet material with a centrally located opening therethrough, an elongated link means extending through the opening in said drag member and fitted with coupling means at both ends and restraining means for maintaining said drag member in a position generally perpendicular to said link means, the releasable covering means for said parachute being attached to said drag member and the end of said link means adjacent said parachute being operatively connected to said closure mechanism, whereby the initial application of a drag load to said drag member actuates the closure mechanism to release the parachute from the covering means.

2. A parachute initially enclosed in a releasable covering means, a quick releasable closure mechanism for said releasable covering, an object to be supported by said parachute, and an initial drag inducer interposed between and interconnecting said parachute and said object, said initial drag inducer comprising a generally planar drag member composed of flat sheet material with a centrally located opening therethrough, said releasable covering means being fixedly secured to the reverse side of the drag member, an elongated flexible link extending through the opening in said drag member, a first connecting means on one end of the link for attachment to said object, a second connecting means on the other end of the link for attachment to the parachute, four elongated flexible tension stays, each connected at one end to the link adjacent the first connecting means and at the other end to one of four spaced points adjacent the periphery of said drag member, said second connecting means also being operatively connected to said closure mechanism, whereby the initial application of a drag load to said drag member is effective to actuate the closure mechanism to release the parachute from the covering means by tensioning the flexible link before the flexible tension stays are pulled taut.

3. A device as described in claim 2 in which said drag member is square in shape and the four said tension stays are equal in length and attached to said drag member at its respective corners.

4. A unit for dropping cargo from a high speed aircraft in flight comprising an elongated cargo container, a releasable covering means for a parachute initially disposed adjacent the after end of said cargo container and including a generally planar drag member composed of rigid flat sheet material with a centrally located opening therethrough, a quick releasable closure mechanism for said releasable covering, a parachute initially enclosed within said releasable covering means, an elongated flexible link extending through the opening in said drag member, a first connecting means on one end of the link for attachment to a length of supporting cable, a supporting cable connected at one end to said first connecting means and at the other end to said cargo container, a second connecting means on the other end of said flexible link for attachment to said parachute, a plurality of elongated flexible tension stays, each connected at one end to the flexible link adjacent the first connecting means and at the other end to one of a plurality of spaced points adjacent the periphery of said drag member, said second connecting means also being operably connected to said closure mechanism whereby the initial application of a drag load to said drag member produces relative displacement of said releasible covering means relative to said supporting cable to fully extend said flexible link and thereby actuate the closure mechanism to release the parachute from the covering means while said unit is being decelerated by said drag member.

References Cited in the file of this patent

UNITED STATES PATENTS

| 11,555 | Lewis | Aug. 22, 1854 |
| 2,566,585 | Smith | Sept. 4, 1951 |

FOREIGN PATENTS

| 15,699 | Great Britain | of 1890 |
| 54,588 | France | Oct. 31, 1949 |